(12) United States Patent
Ball et al.

(10) Patent No.: US 7,783,994 B2
(45) Date of Patent: Aug. 24, 2010

(54) METHOD FOR PROVIDING SECURE AND TRUSTED ASICS USING 3D INTEGRATION

(75) Inventors: Harold Hasely Ball, Woodbine, MD (US); Michael Robert Lucas, Ellicott City, MD (US); Anastasios P. Goutzoulis, Annapolis, MD (US)

(73) Assignee: Northrop Grumman Systems Corporation, Los Angeles, CA (US)

( * ) Notice: Subject to any disclaimer, the term of this patent is extended or adjusted under 35 U.S.C. 154(b) by 922 days.

(21) Appl. No.: 11/638,530

(22) Filed: Dec. 14, 2006

(65) Prior Publication Data

US 2008/0148073 A1   Jun. 19, 2008

(51) Int. Cl.
    *G06F 17/50*   (2006.01)
(52) U.S. Cl. .................................. 716/1; 716/11; 716/16
(58) Field of Classification Search .................... 716/1, 716/7–11, 16–19; 438/109, 458, 636; 257/686, 257/678, 738, 777; 326/39, 41
See application file for complete search history.

(56) References Cited

U.S. PATENT DOCUMENTS

2008/0244500 A1*   10/2008   Solomon .................... 716/16

* cited by examiner

*Primary Examiner*—Paul Dinh
(74) *Attorney, Agent, or Firm*—Andrews Kurth LLP

(57) ABSTRACT

A system and a method for providing secure and trusted application specific integrated circuits (ASICs) using three-dimensional (3D) integrated circuit (IC) integration. The method includes fabricating a plurality of sub-circuits and assembling an overall 3D ASIC device from the plurality of sub-circuits. Each sub-circuit includes a plurality of input-output (IO) pads, is fabricated with a orientation point that indicates a compass orientation of the sub-circuit, and is rotationally symmetrical. The assembling includes determining the designed sub-circuit integration order, determining the designed orientation for each sub-circuit, stacking each sub-circuit per the determined integration order, and orienting each sub-circuit per the determined orientation, and wherein function and operation of the overall 3D ASIC device is determinable only from the assembled 3D ASIC stack and not the sub-circuits. The fabricating may be performed at one or more un-trusted facilities and the assembling may be performed at a trusted facility remote from the fabricating facilities.

22 Claims, 5 Drawing Sheets

US 7,783,994 B2

METHOD FOR PROVIDING SECURE AND TRUSTED ASICS USING 3D INTEGRATION

BACKGROUND

Department of Defense (DoD) applications require a source of Application Specific Integrated Circuits (ASICs) that can be trusted to contain only the desired design functionality and performance with no damaging or malicious features inserted. Also, the ability to resist tampering and reverse engineering are extremely important when DoD products are exported to foreign nations. The problem is exacerbated by a continually diminishing domestic source of supply of state-of-the-art integrated circuit fabrication facilities, due to cost pressures which are driving integrated circuit (IC) fabrication to low cost countries. Circuit designs must often be sent overseas for fabrication, providing opportunities for compromise. Fabrication of state-of-the-art circuits in domestic foundries which have secure facilities is often not cost effective for many DoD programs and does not protect against vulnerabilities which can be introduced via entrusted design tools or test. What is needed is a method for providing secure and trusted ASICs. What is needed is a process of securely assembling ASICs.

SUMMARY

An advantage of the embodiments described herein is that they overcome the disadvantages of the prior art. Another advantage of certain embodiments is they provide secure and trusted ASICs in a reasonable, cost-effective manner.

These advantages and others are achieved by a method for providing secure and trusted application specific integrated circuits (ASICs) using three-dimensional (3D) integrated circuit (IC) integration. The method includes fabricating a plurality of sub-circuits and assembling an overall 3D ASIC device from the plurality of sub-circuits. Each sub-circuit includes a plurality of input-output (IO) pads, is fabricated with a orientation point that indicates a compass orientation of the sub-circuit, and is rotationally symmetrical. The assembling includes determining the designed sub-circuit integration order, determining the designed orientation for each sub-circuit, stacking each sub-circuit per the determined integration order, and orienting each sub-circuit per the determined orientation, and wherein function and operation of the overall 3D ASIC device is determinable only from the assembled 3D ASIC stack and not the sub-circuits. The fabricating may be performed at one or more un-trusted facilities and the assembling may be performed at a trusted facility remote from the fabricating facilities. A secure and trusted 3D ASIC manufactured according to this method provides these and other advantages as well.

These advantages and others are also achieved by a secure and trusted application specific integrated circuit (ASIC) using three-dimensional (3D) integrated circuit (IC) integration. The secure and trusted ASIC includes a 3D ASIC stack. The 3D ASIC stack includes a plurality of sub-circuits. Each sub-circuit forms a separate layer of the 3D ASIC stack. Each sub-circuit includes a plurality of input-output (IO) pads. Each sub-circuit has an orientation point that indicates a compass orientation of the sub-circuit. Each sub-circuit is rotationally symmetrical so that each sub-circuit can be rotated so that its orientation point faces any one of a plurality of pre-determined orientation positions and still have IO pads align. The sub-circuits are stacked in the 3D ASIC stack according to a pre-determined integration order and each sub-circuit is oriented per each sub-circuit pre-determined orientation positions so that the overall 3D ASIC design is determinable only from the 3D ASIC stack and not the sub-circuits.

DESCRIPTION OF THE DRAWINGS

The detailed description will refer to the following drawings, wherein like numerals refer to like elements, and wherein.

DETAILED DESCRIPTION

Figure 1:
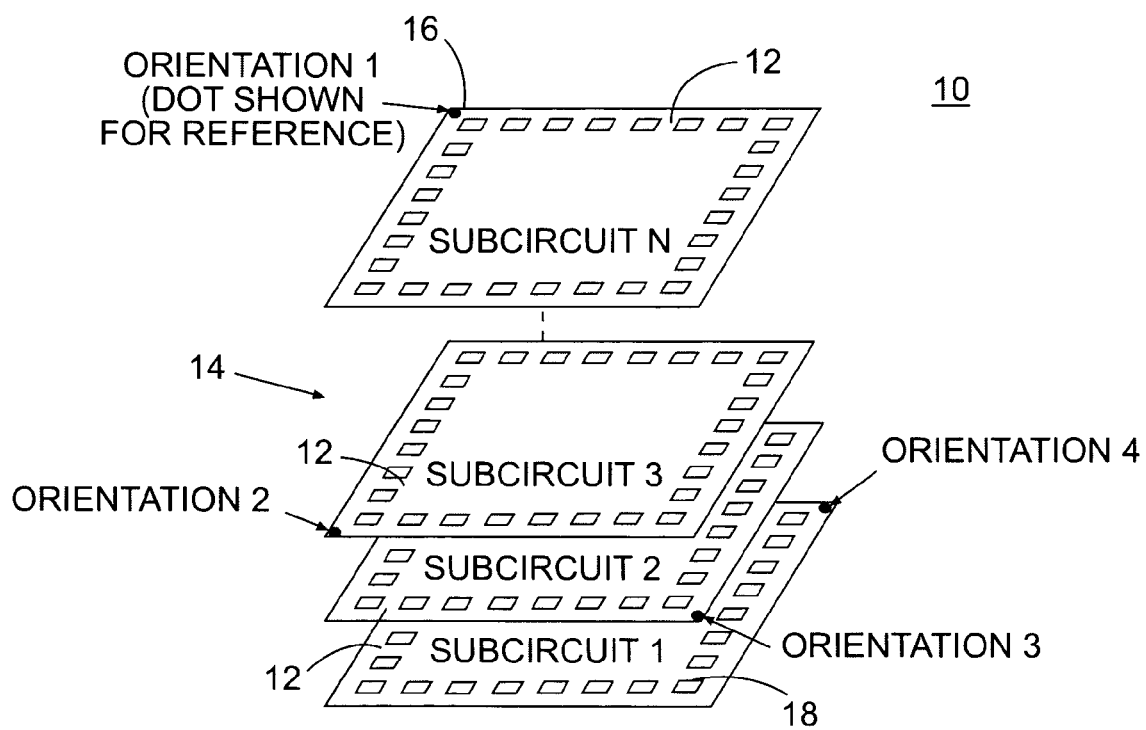
FIG. 1 is a block diagram illustrating an embodiment of a system for providing secure and trusted ASICs using 3D IC integration.

Described herein are a system and method for providing secure and trusted Application Specific Integrated Circuits (ASICs) using three-dimensional (3D) integrated circuit (IC) integration. Such a system and method creates secure and trusted ASICs. Embodiments provide ASICs with higher levels of density and performance. Embodiments make reverse engineering of the ASIC design and unauthorized device modification virtually impossible, while enabling device fabrication in unsecured facilities employing standard unsecured design tools. In embodiments described herein, the overall ASIC design is created in a trusted manner with trusted people, facilities, and tools. The final step of the overall design process is to divide the design into a number of separate, individual ASIC designs and to define each of them in un-trusted foundry-compatible terms, tools, and data bases. An un-trusted facility is not secure and is lacking in security measures that would prevent tampering with and improper examination of ASIC designs. This division includes not only a separation of the overall design into multiple individual ICs, but also designates a wafer 3D integration order and "compass" orientation of 0°, 90°, 180°, or 270° for each wafer. The individual ASIC designs can then be sent to un-trusted foundries for fabrication without any of the overall design information, including the fact that these individual ASICs are the components of an overall 3D ASIC. After fabrication of the individual ASICs, the ASICs are returned to a trusted integration center for the integration of the overall 3D ASIC using trusted integration processes, facilities, and tools. The cost of such a 3D integration center is orders of magnitude less than an IC fabrication foundry, allowing easy setup in a trusted facility.

Circuits are much more secure from insertion of malicious hardware using the above-described approach. With a conventionally fabricated IC, analysis of the masks or actual devices can provide a detailed circuit layout and schematic. Then, the circuit functions can be reversed engineered from the determined layout. Furthermore, "backdoor" circuits inserted into the IC without the original designer's knowledge. The embodiments described herein greatly increase the effort required to reverse engineer a circuit and understand its function well enough to insert these malicious circuits. The embodiments also make it extremely difficult to understand and exploit intellectual property contained in the designs. Indeed, to reverse engineer the design from ICs fabricated using embodiment described herein would require the computation-intensive reverse engineering of millions or billions of possible sub-circuit interconnects instead of a single design. The complexity level of an ASIC provided using embodiments described herein can be selected based on the security desired for the circuit.

Embodiments of the system and method for providing secure and trusted ASICs using 3D IC integration start with producing a robust ASIC design within a trusted environment which can then be easily partitioned into a) information that can be retained and held secure within the trusted environment and b) multiple individual ASIC designs that can be openly fabricated in un-trusted foundries.

With reference now to FIG. 1, shown is an embodiment of system 10 for providing secure and trusted ASICs using 3D IC integration. As shown, system 10 includes "n" number of individual ASICs 12, or "sub-circuits," placed in a stack to form overall ASIC 14. Also shown are sample sub-circuit 12 orientations (indicated by orientation points 16). Orientation points 16 indicate the compass orientation of each layer (sub-circuit 12). The trusted design of the overall 3D ASIC is created and then partitioned into n unique sub-circuits 12. Each sub-circuit 12 is fabricated as a separate IC and each sub-circuit 12 is designed to be physically placeable in overall ASIC stack 14 at any level. Input-output (IO) pads 18 are designed to be rotationally symmetrical so the ICs 12 can be rotated into one of four positions and still have inputs and outputs match and align. For example, the four positions may be designated as North, East, South and West. A first layer may be designated as North, a second as South, a third as East and a fourth as West. The first layer will be rotated so that its orientation point 16 points North, the second layer rotated so that its orientation point 16 points in the opposite direction of the first layer (i.e., South), the third layer rotated so that its orientation point 16 points 90° to the right of North (when facing North), and the fourth layer rotated so that its orientation point 16 points 90° to the left of North (when facing North).

The separation of the master design into these individual designs (sub-circuits 12) is performed in a manner such that initial evaluation of a particular arrangement of layers and orientations will appear to produce a valid electrical function, but the function of the ASIC 14 as a whole will require intensive reverse engineering to determine the whole device operation. Only one of the many possible arrangements of layers and orientations produces the desired 3D ASIC 14 function. This complexity limits the understanding of the ASIC 14 operation by any entrusted supplier and prevents correct operation of any unwanted functions which may be inserted.

As the number of layers (i.e., sub-circuits 12), n, becomes larger, the number of possible configurations (based on layer sequence and orientation) of the overall 3D ASIC 14 design grows astronomically in accordance with $(n!) \times (4^{(n-1)})$. The overall design can essentially be "encrypted" with a simple code of layer sequence and orientation that remains within the trusted arena (e.g., trusted ASIC 14 assembly facility) and is not needed or released to any un-trusted arena, including the fabrication foundries.

Figure 2:
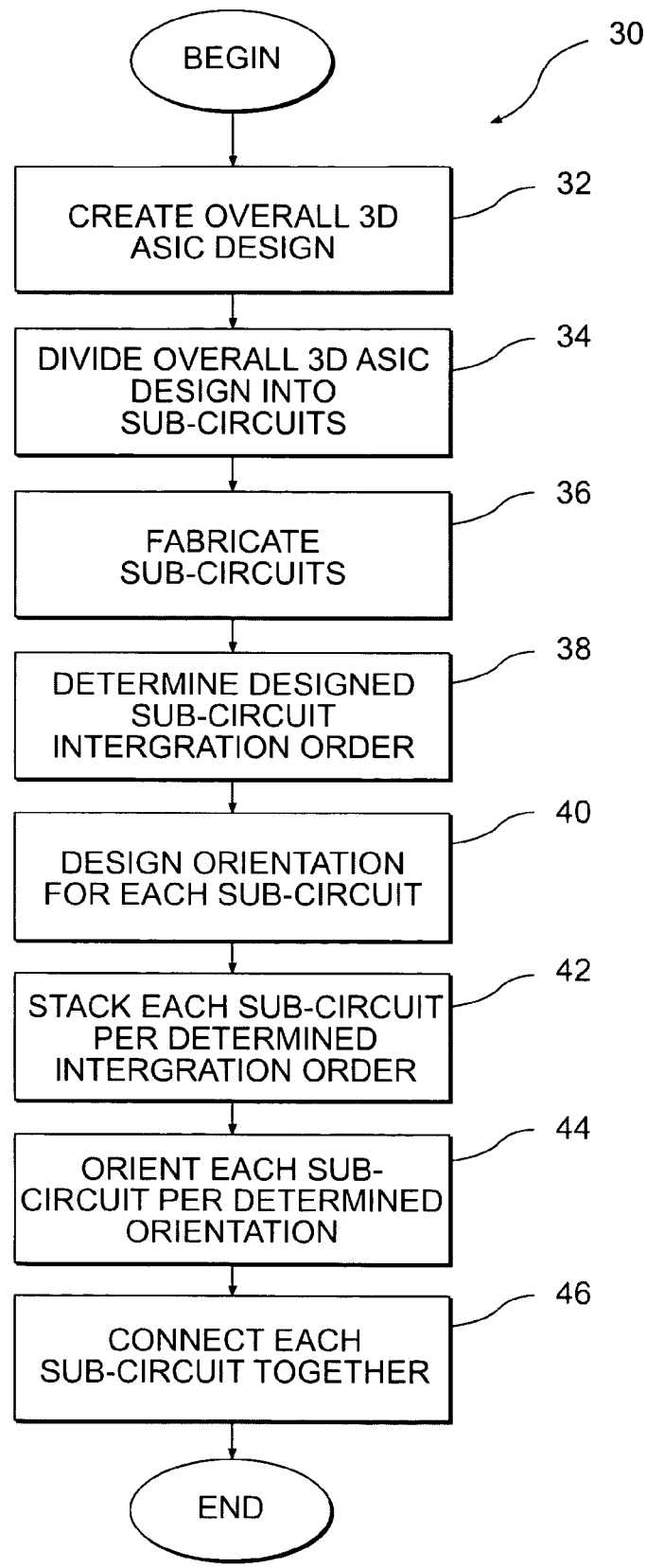
FIG. 2 is a flowchart illustrating an embodiment of a method for providing secure and trusted ASICs using 3D IC integration.

With reference now to FIG. 2, shown is an embodiment of method 30 for providing secure and trusted ASICs using 3D IC integration. Method 30 includes creating overall 3D ASIC design, block 32. The overall 3D ASIC is the completed circuit once all of the individual layers are fabricated and assembled. Creating the overall 3D ASIC design includes determining the overall function and operation of the completed circuit and determine the circuit sub-components necessary to achieve the overall function and operation. The overall 3D ASIC design is created in a trusted manner with trusted people, facilities, and tools.

The overall 3D ASIC design is divided into sub-circuits, block 34. Dividing the overall 3D ASIC design includes creating separate, individual ASIC designs and defining each of the individual ASIC designs in un-trusted foundry-compatible terms, tools, and data bases. This division includes not only a separation of the overall 3D ASIC design into multiple individual ICs (e.g., sub-circuits 12), but also designates a wafer 3D integration order (i.e., a layer integration order) and "compass" orientation of 0°, 90°, 180°, or 270° for each wafer. The layer integration order is the order in which sub-circuits 12 are stacked and the compass orientation is the orientation of each sub-circuit 12 as indicated by orientation point 16.

With continued reference to FIG. 2, method 30 further includes fabricating the sub-circuits, block 36. Sub-circuits 12 may be fabricated using standard fabrication techniques known to those of ordinary skill in the art. Fabricating 36 may take place in un-trusted foundries or other facilities. Preferably, different sub-circuits 12 are fabricated at different facilities, although this is not required. After being fabricated, the sub-circuits 12 are assembled into the overall 3D ASIC device, blocks 38-46. In the embodiments described herein, assembly includes determining the designed sub-circuit integration (i.e., stacking) order, block 38, determining the designed orientation for each sub-circuit, block 40, stacking each sub-circuit per the determined integration order, block 42, orienting each sub-circuit per the determined orientation, block 44, and connecting each sub-circuit (i.e., each layer of the overall 3D ASIC) together, block 46. The designed stacking order and orientation may be determined by looking up and examining the overall 3D ASIC design and the designated integration and orientation for each wafer (i.e., sub-circuit 12). Each sub-circuit may be stacked and oriented as part of one assembly action (e.g., in an assembly line). Connecting each sub-circuit includes physically and electronically connecting each layer.

Figure 3:
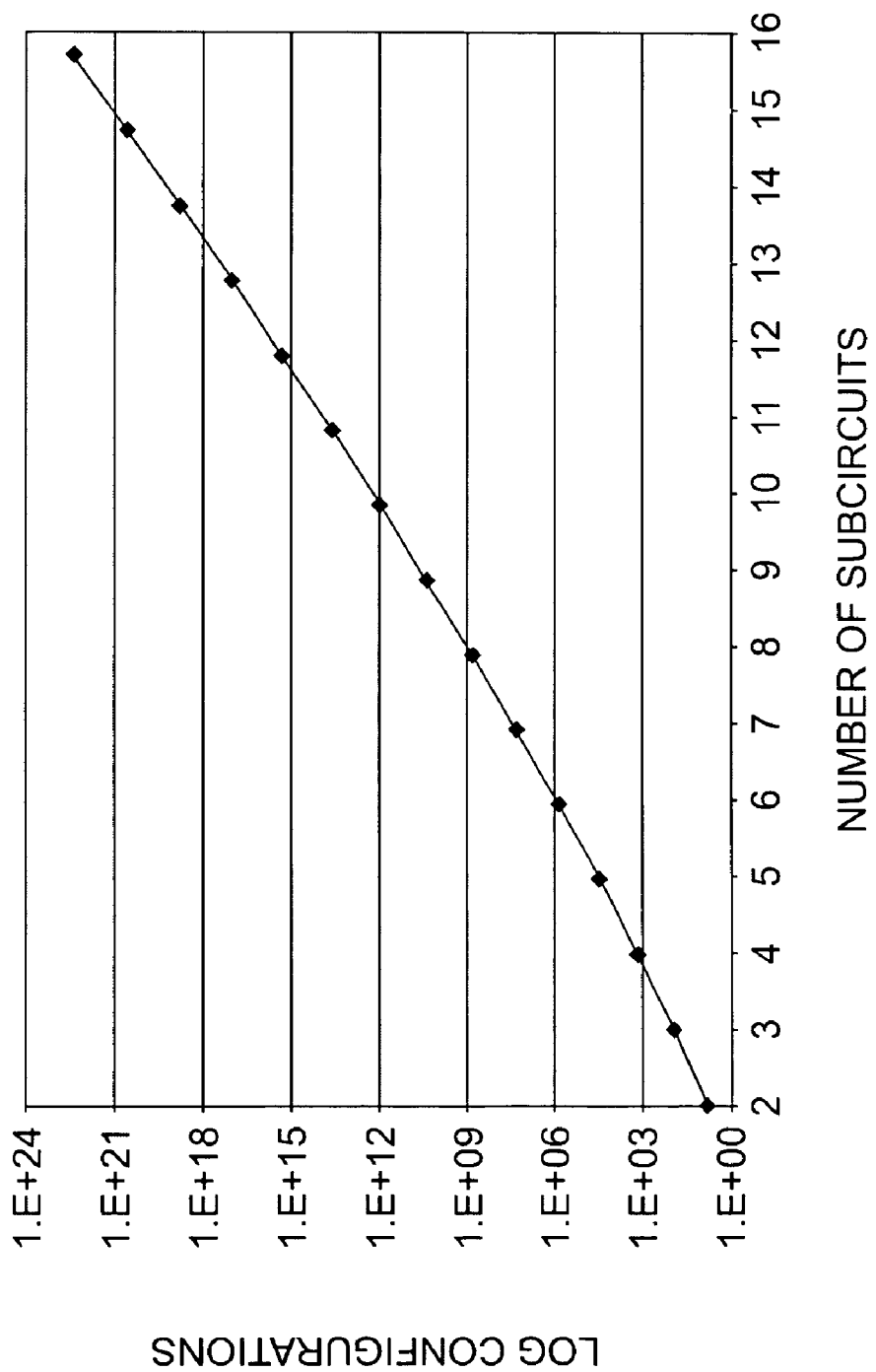
FIG. 3 is a graph illustrating a number of possible 3D ASIC device configurations, provided by embodiments of a system and method for providing secure and trusted ASICs using 3D IC integration, as a function of the number of layers.

With reference now to FIG. 3, shown is a graph illustrating the number of possible ASIC 14 configurations as a function of the number of layers (i.e., sub-circuits 12), n. As shown, if n is 7 there are over 20 million possibilities to try to reverse engineer, if n is 9 there are over 23 billion, if n is 11 there are over 41 trillion, and so on. Consequently, as the number of layers is increased, the higher the level of security provided by ASIC 14.

Pieces of information that can be retained and held secure within the trusted environment are:
    the design encryption "key" which is the order of the individual layers (i.e., sub-circuits 12) and each layer's 12 compass orientation (indicated by orientation point 16)
    the total number of layers 12 in the 3D ASIC 14
    the specific layers 12 that are part of a specific 3D ASIC set
    the fact that the individual layers 12 are part of a larger 3D ASIC 14

The graph shown in FIG. 3 only reflects the effect of the first two factors above—i.e., the possible configurations due to the number of layers, the order of the layers and the orientation of the layers. Additional ASIC 14 security can be provided via the other points discussed.

There are several reasons why the 3D Integrated ASIC system 10 and method 12 are unique for securing the design of an ASIC:

(1) The individual sub-circuit IC 12 designs can be sent out to open, commercial foundries with only the information required to fabricate that individual sub-circuit 12
(2) The overall 3D ASIC 14 design is performed in a trusted environment which is available and affordable
(3) The 3D integration of the individual sub-circuits 12 can be performed inexpensively in a low cost, trusted facility
(4) Various methods of additional security can be inexpensively employed
(5) This approach can be utilized in the commercial arena as well as the military arena
(6) Normal techniques for anti-tamper detection and protection can be incorporated in the overall design.
(7) The process also accommodates heterogeneous layers employing different materials and multiple mixed mode technologies including analog, RF, digital, and photonics. The addition of these trust features does not inhibit any of the above capabilities.

The fabrication of a trusted 3D ASIC 14 using system 10 and method 30 utilizes 3D interconnect technologies. A commercial infrastructure currently exists for assembling multiple ICs into a stack and a variety of techniques may be used. The individual sub-circuits 12 can be solder bumped and soldered together in the overall ASIC stack 14. Another commercial approach involves bonding sub-circuits 12 together with an adhesive, etching vias through sub-circuits 12, and metallizing the vias for electrical contact.

Figure 4A:
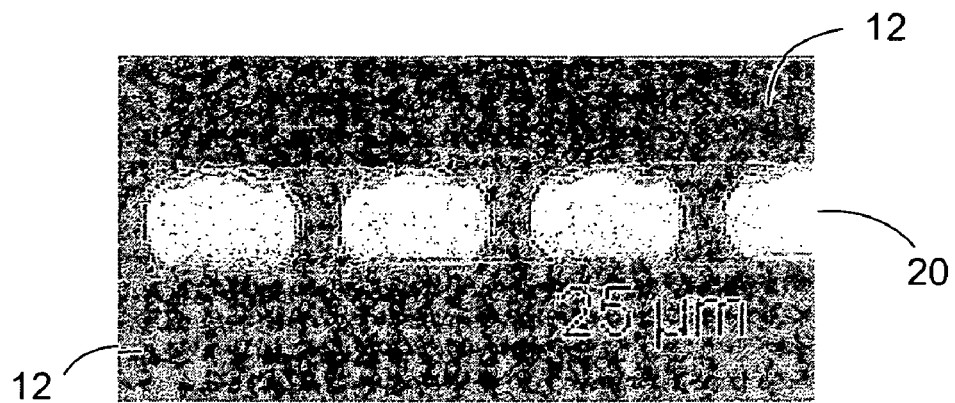
FIGS. 4A-4B are cross-sectional views of representative techniques for stacking layers of a 3D ASIC device in embodiments of a system and method for providing secure and trusted ASICs using 3D IC integration.
Figure 4B:
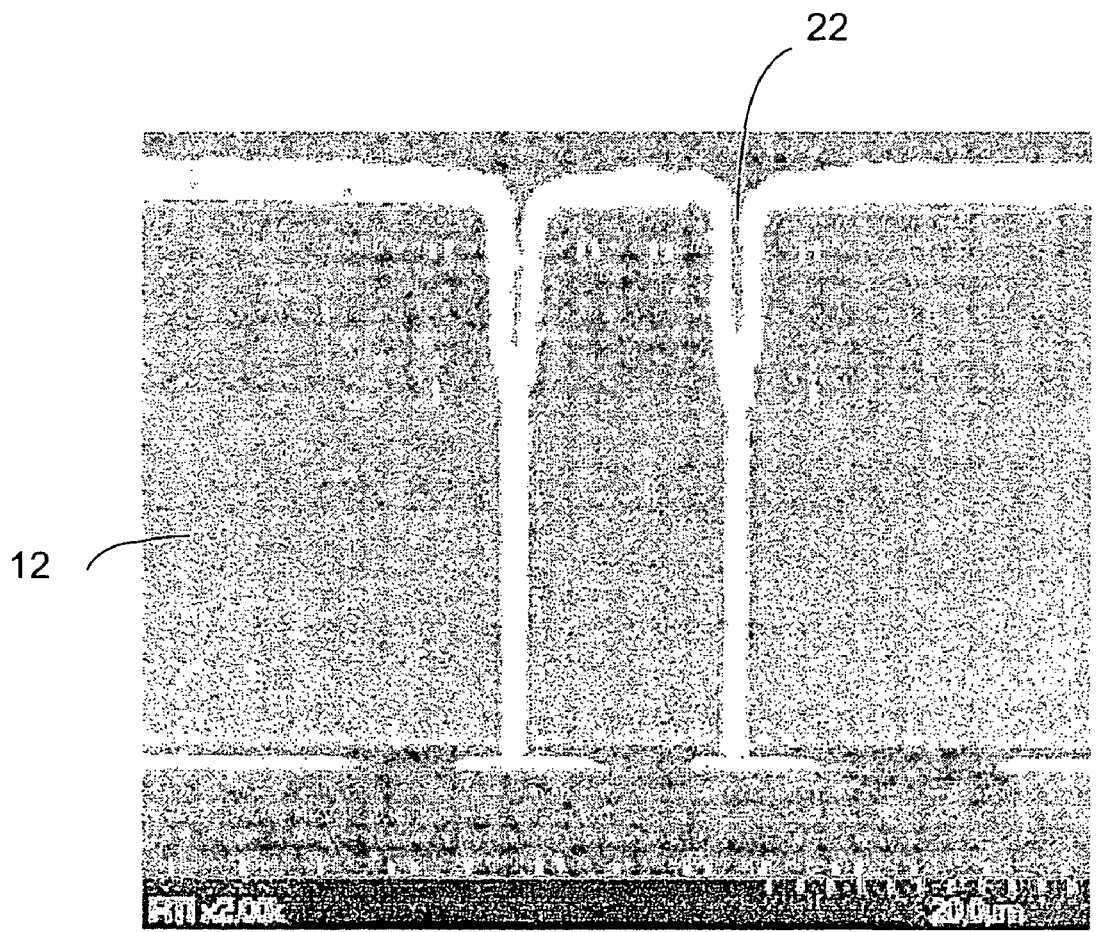

With reference now to FIGS. 4A-4B, shown are cross sections of stacked sub-circuits 12 assembled using a representative process for stacking ICs (e.g., sub-circuits 12) with solder bumps 20 and etched vias 22. FIG. 4A shows two layers (sub-circuits) 12 bonded with solder bumps 20. FIG. 4B shows sub-circuit 12 with etched vias 22 in sub-circuit 12 for electrically connecting adjacent sub-circuits 12 (and the devices disposed on sub-circuits 12). These and similar connection techniques may be used to stack multiple layers (sub-circuits) 12 to form overall 3D ASIC 14.

Figure 5:
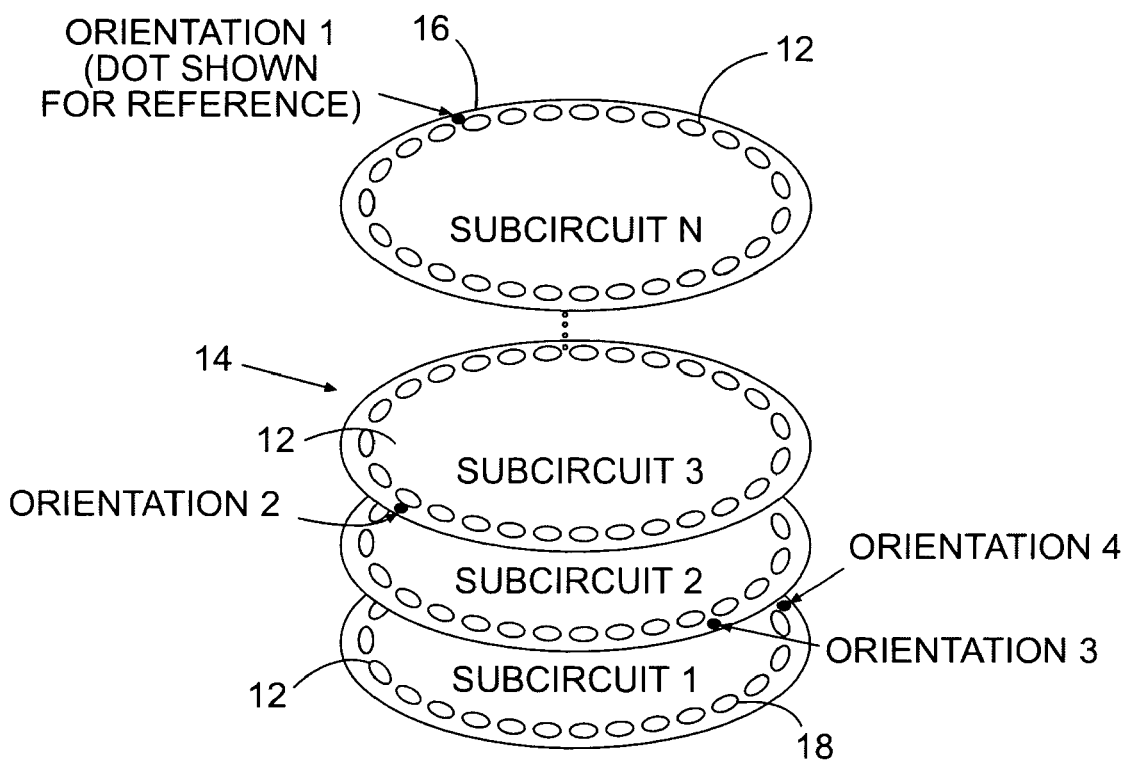
FIG. 5 is a block diagram illustrating an embodiment of a system for providing secure and trusted ASICs using 3D IC integration.

With reference now to FIG. 5, shown is an alternative embodiment of system 50 for providing secure and trusted ASICs using 3D IC integration. As shown, system 50 includes "n" number of individual ASICs 52, or "sub-circuits," placed in a stack to form overall ASIC 54. In the alternative embodiment shown, sub-circuits 52 are circular. Typically, ICs are square, as shown in FIG. 1, or rectangular, with bond (IO) pads along the edge. ICs are designed this way to shorten the wire bonds to the overall package. In a 3D orientation, bond (IO) pads 58 may be designed in a circular pattern as shown in FIG. 5. Indeed, IO pads 58 may be placed well away from the edge of each sub-circuit 52 to shorten the interconnection distance from 10 pads 58 to transistors on the wafer, which would lead to faster IC performance for each sub-circuit 52 and the overall 3D ASIC device. Furthermore, in a rotationally symmetrical design, the number of possible orientations is substantially increased. As above, sample sub-circuit orientations are shown with orientation points 56 indicating the compass orientation of each layer (sub-circuit 52). As opposed to four orientation points 56 shown in FIG. 1 above, however, there may be orientation points all along the circular edge of each sub-circuit. Likewise, the trusted design of the overall 3D ASIC is created and then partitioned into n unique sub-circuits 52. Each sub-circuit 52 is fabricated as a separate IC and each sub-circuit 52 is designed to be physically placeable in overall ASIC stack 54 at any level. Input-output (IO) pads 58 are designed to be rotationally symmetrical so the ICs 52 can be rotated into the designed orientation indicated by orientation points 56 and still have inputs and outputs match and align.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

The invention claimed is:

1. A secure and trusted application specific integrated circuit (ASIC) using three-dimensional (3D) integrated circuit (IC) integration, comprising:
   a 3D ASIC stack, including:
      a plurality of sub-circuits in which:
         each sub-circuit forms a separate layer of the 3D ASIC stack;
         each sub-circuit includes a plurality of input-output (IO) pads;
         each sub-circuit has an orientation point that indicates a compass orientation of the sub-circuit; and
         each sub-circuit is rotationally symmetrical so that each sub-circuit can be rotated so that its orientation point faces any one of a plurality of pre-determined orientation positions and still have IO pads align; and
      wherein the sub-circuits are stacked in the 3D ASIC stack according to a pre-determined integration order and each sub-circuit is oriented per each sub-circuit pre-determined orientation positions so that the overall 3D ASIC design is determinable only from the 3D ASIC stack and not the sub-circuits.

2. The secure and trusted ASIC of claim 1 in which each sub-circuit is an integrated circuit (IC).

3. The secure and trusted ASIC of claim 1 in which each sub-circuit is square.

4. The secure and trusted ASIC of claim 3 in which each sub-circuit has a pre-determined orientation positions chosen from any one of four compass orientations.

5. The secure and trusted ASIC of claim 1 in which each sub-circuit is circular.

6. The secure and trusted ASIC of claim 5 in which in which each sub-circuit has a pre-determined orientation positions chosen from any one of a plurality of compass orientations around the circumference of the sub-circuit.

7. The secure and trusted ASIC of claim 1 in which each sub-circuit is connected to another sub-circuit.

8. The secure and trusted ASIC of claim 7 in which the sub-circuits are connected using solder bumps.

9. The secure and trusted ASIC of claim 7 in which the sub-circuits include metalized vias connecting the sub-circuits.

10. The secure and trusted ASIC of claim 7 in which the sub-circuits are connected using adhesive.

11. The secure and trusted ASIC of claim 1 wherein the sub-circuits are fabricated in one or more facilities remotely located from an assembly location where the 3D ASIC stack is assembled.

12. The secure and trusted ASIC of claim 11 wherein the sub-circuits are fabricated in an un-trusted facility.

13. The secure and trusted ASIC of claim 11 wherein the 3D ASIC stack is assembled in a trusted facility.

14. A method for providing secure and trusted application specific integrated circuits (ASICs) using three-dimensional (3D) integrated circuit (IC) integration, comprising:

fabricating a plurality of sub-circuits, wherein each sub-circuit includes a plurality of input-output (IO) pads, is fabricated with a orientation point that indicates a compass orientation of the sub-circuit, and each sub-circuit is rotationally symmetrical;

assembling an overall 3D ASIC device from the plurality of sub-circuits, wherein the assembling comprises:
  determining the designed sub-circuit integration order;
  determining the designed orientation for each sub-circuit;
  stacking each sub-circuit per the determined integration order; and
  orienting each sub-circuit per the determined orientation; and wherein function and operation of the overall 3D ASIC device is determinable only from the assembled 3D ASIC stack and not the sub-circuits.

15. The method of claim 14 wherein the assembling further comprises connecting the sub-circuits together.

16. The method of claim 14 wherein the fabricating is performed in an un-trusted facility.

17. The method of claim 14 wherein the assembling is performed in a trusted facility.

18. The method of claim 14 wherein the assembling is performed in a facility remote from the fabricating.

19. The method of claim 14 further comprising creating an overall 3D ASIC device design.

20. The method of claim 19 further comprising dividing the overall 3D ASIC design into the plurality of sub-circuits.

21. The method of claim 20 wherein the dividing comprises:
  creating separate, individual ASIC designs corresponding to each sub-circuit; and
  defining each of the individual ASIC designs.

22. A secure and trusted 3D ASIC device manufactured according to the method of claim 14.

* * * * *